Feb. 25, 1958

E. P. TURNER 2,824,633

ELECTRIC POWER TRANSMITTER NEUTRAL
POSITIONING DEVICES

Filed March 4, 1953

INVENTOR.
Edgar P. Turner
BY

ATTORNEY

WITNESS:

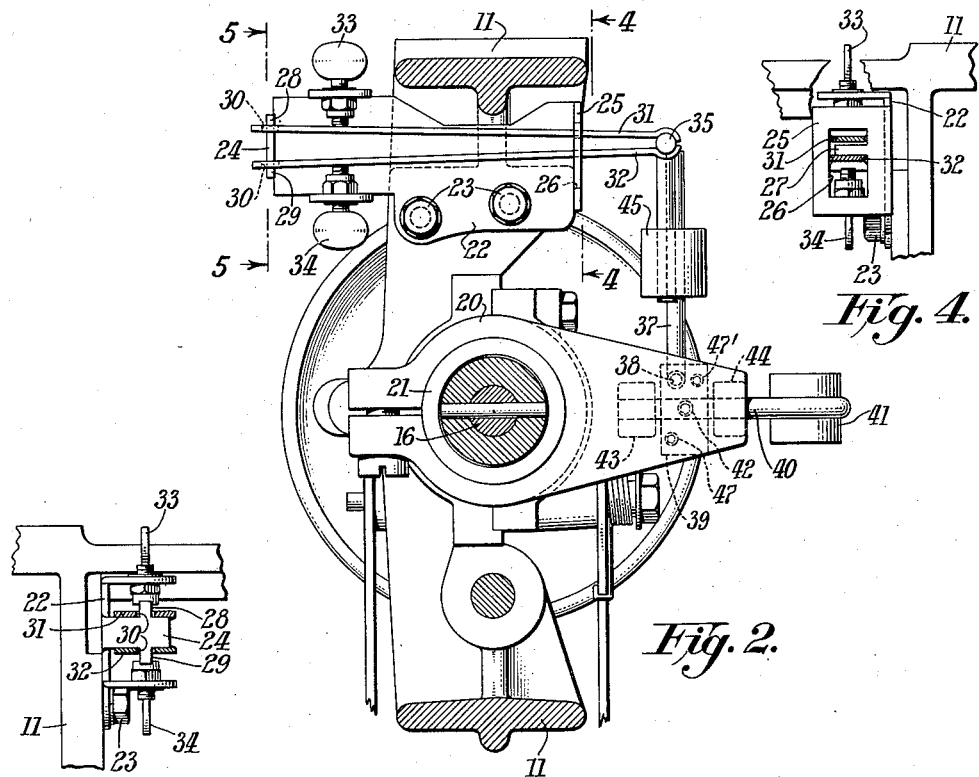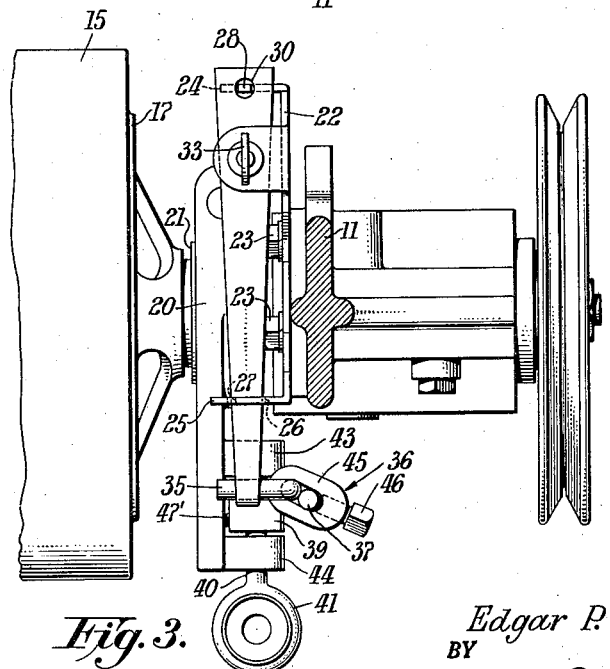

United States Patent Office 2,824,633
Patented Feb. 25, 1958

2,824,633

ELECTRIC POWER TRANSMITTER NEUTRAL POSITIONING DEVICES

Edgar P. Turner, Fanwood, N. J., assignor to The Singer Manufacturing Company, Elizabeth, N. J., a corporation of New Jersey Application March 4, 1953, Serial No. 340,233

7 Claims. (Cl. 192—18)

This invention relates to a driving mechanism or electric power transmitter which is particularly adapted for driving industrial type sewing machines. The invention relates more particularly to a device for controlling the clutch and brake actuation of such a power transmitter.

A sewing machine driving device or power transmitter of this type comprises a rotatable driven shaft which can be clutched to a rotating power element or connected to a brake. The actuation of the clutch and brake mechanism is controlled by a manually actuated control lever which is connected to a foot treadle. A spring normally holds the brake engaged, thus holding the driven shaft of the power transmitter and the sewing machine mechanism stationary. The brake is released and the clutch engaged by applying pressure to the foot treadle to move the control lever against the force of the spring. This mechanism causes the brake to remain applied each time the operator removes pressure upon the foot treadle. Frequently, it is desirable to change the position of the sewing machine needle-bar by manually turning the sewing machine balance wheel. However, in order to turn the balance wheel by hand, the brake must be released by skillful manipulation of the foot treadle and, at the same time, care must be taken not to engage the clutch. Proper actuation of the treadle requires a skilled operator and is generally time consuming.

One of the objects of this invention is to provide neutral positioning means whereby the clutch and brake of the power transmitter remain disengaged until the operator applies a force to engage them.

Another object of the invention is to provide a neutral positioning device which can be easily installed and which can be adjusted readily.

A further object of the invention is to provide means for adjusting the neutral positioning device to compensate for wear of the clutch and brake surfaces.

With the above and other objects in view, the invention comprises the devices and arrangements of parts hereinafter described and illustrated in the accompanying drawings from which the several features and advantages of the invention will be readily understood by those skilled in the art.

In the drawings,

Fig. 2 is a view taken substantially on line 2—2 of Fig. 1.

Fig. 3 is a top plan view of the neutral positioner device.

Fig. 4 is a view taken substantially on line 4—4 of Fig. 2.

Fig. 5 is a view taken on line 5—5 of Fig. 2.

Figure 1:
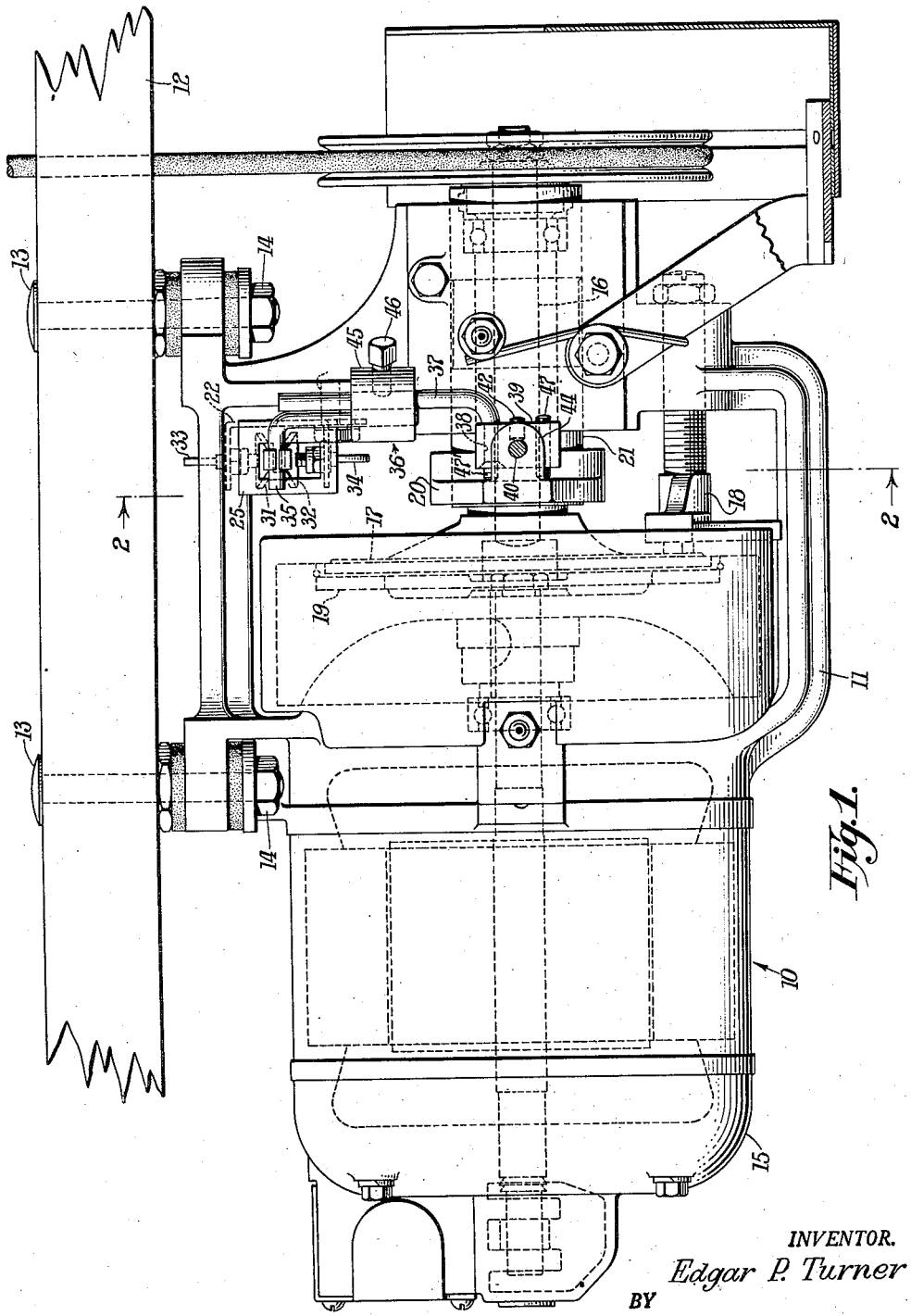
Fig. 1 is a front elevational view, partly in section, of an electric power transmitter embodying my invention.

Referring more specifically to the drawings, an electric power transmitter 10 is shown which is of the same general construction as the transmitter shown in the Peets et al. U. S. Patent No. 2,004,055, dated June 4, 1935. A cast metal frame 11 is fastened to a supporting member 12 by volts 13 and nuts 14. The frame 11 supports a driving electric motor 15 at one end and rotatably supports a driven shaft 16 at the opposite end. The driven shaft 16 carries at one end a friction disc 17 which is disposed between an adjustable brake member 18 carried by the frame 11 and a rotatable clutch member 19 driven by the motor 15. The driven shaft 16 can be moved axially to engage the disc 17 with the clutch member 19 or the brake member 18 by moving a lever 20 fastened to a control sleeve 21. Movement of the lever 20 downwardly, as viewed in Fig. 1, causes the sleeve 21 and driven shaft 16 to move axially to the left to engage the disc 17 with the clutch member 19 and movement of the lever 20 upwardly causes the shaft 16 to move to the right to engage the disc 17 with the brake 18, as fully described in the Peets et al. Patent No. 2,004,055. In prior devices similar to the device shown in the Peets et al. patent, the lever 20 is always spring urged upwardly to hold the disc 17 in engagement with the brake 18.

The transmitter structure which has been described above is old and well known. However, as set out above, one of the objects of this invention is to hold the lever 20 in a neutral position with both the clutch and the brake disengaged. This is accomplished by means of the mechanism about to be described.

A bracket 22 is fastened to the frame 11 by two screws 23 and is provided at each end with support pieces 24 and 25 which extend substantially perpendicular to the body portion of the bracket 22. An opening 26 is formed in the support piece 25 across which extends a horizontal stop member or support tongue 27 formed integral with the end piece 25. The support piece 24 at the opposite end of the bracket 22 carries two oppositely extending fingers 28 and 29 which enter holes 30 formed in the ends of two leaf-type springs 31 and 32. The top or brake releasing spring 31 rests on the stop member 27 and the support piece 24. An adjusting screw 33 carried by the bracket 22 engages the spring between the stop member 27 and the support piece 24 on the side of the spring opposite thereto. The bottom or clutch releasing spring 32 is held in engagement with the lower edge of the support 24 and the stop member 27 by an adjusting screw 34 carried by the body part of the bracket 22. The fingers 28 and 29 extend through the holes 30 in the springs 31 and 32, respectively, and hold the springs in position. One end piece 35 of an adjustable link 36 is disposed between the curved free ends of the springs 31 and 32. The other end piece 37 of the link 36 enters a pivot hole 38 in a pivot block 39. The pivot block 39 is fastened to the shank 40 of a control eye 41 by a set screw 42 between two bosses 43 and 44 formed on the lever 20 through which the shank passes. A clamp 45 and a clamp screw 46 hold the link end pieces 35 and 37 together. Two set screws 47 and 47' are threaded into the block 39 on either side of the shank 40 for clamping the block and shank in place. The lever 20 can be moved by any suitable operating means (not shown) connected to the control eye 41. The length of the link 36 is adjusted to the correct length to hold both the clutch and brake disengaged when no operating force is applied to the lever.

From the above description, it is believed that the operation and advantages of the device will be readily understood. When the transmitter is in its neutral position, as shown in the drawings, and no actuating force is applied to the lever 20, the springs 31 and 32 hold the lever 20 yieldingly in a neutral position with the disc 17 positioned out of engagement with both the clutch member 19 and the brake member 18. This permits the driven shaft 16 to be turned freely by hand to position or operate the driven machine (not shown). When it is desired to engage the disc 17 with the clutch member 19, an actuating force is applied downwardly to the lever 20, as viewed in Figs. 1 and 2, to move the lever 20 downwardly against the force of the bottom leaf spring 32. The top leaf spring 31 does not follow the link 36 but remains resting on the stop member 27. Upon release of the downwardly applied actuating force, the leaf spring 32 returns the lever 20 to its neutral position and disengages the clutch. In a similar manner, when it is desired to engage the brake, an upwardly directed actuating force is applied to the lever 20 to cause the lever to move upwardly against the force of the spring 31 and engage the disc 17 with the brake member 18. When the actuating force is removed from the lever 20, the leaf spring 31 acting through the link 36 returns the lever 20 to its neutral position with the disc 17 out of engagement with the brake 18. The force with which the springs 31 and 32 return the lever 20 to its neutral position can be varied by adjusting the screws 33 and 34.

As the clutch member 19 and brake member 18 wear, the proper operating clearances are maintained by adjusting the brake member 18, as described in the said Peets et al. patent. This adjustment moves the brake member 18 and changes the distance between the clutch member 19 and the brake member 18. Therefore, the neutral position of the disc 17 and the neutral position of the lever 20 are also changed. In order to maintain the lever 20 in its new neutral position, the length of the link 36 is adjusted by loosening the clamping screw 46 and sliding the two end pieces 35 and 37 relative to each other until the length of the link 36 is such that the springs 31 and 32 hold the lever yieldingly in a neutral position. The clamping screw 46 is then tightened to hold the link end pieces 35 and 37 in position. The two set screws 47 and 47' provide a further adjustment to assure proper operation of the device. By adjusting the two set screws 47 and 47' the block 39 can be rocked about the shank 40 to align the hole 38 in the block 39 with the end of the link end piece 37 to permit the end piece 37 to turn freely in the block 39.

From the above description, it is apparent that I have provided a simple and efficient neutral positioner for an electric power transmitter which can be manufactured inexpensively and installed readily. Further, the neutral positioning device can be readily adjusted to compensate for wear of the transmitter clutch and brake and the force, applied by the neutral positioner springs, can be readily changed.

Having thus set forth the nature of the invention, what I claim herein is:

1. An electric power transmitter comprising a frame, a rotatable driving member and a brake member carried by said frame, a rotatable and axially movable driven element carried by said frame, a friction disc disposed between said members and secured to said driven element, means for moving said disc into engagement with said members including a manually operated actuating lever having a pivotal axis, two substantially parallel leaf-type springs carried by said frame, and a link of adjustable length having one end disposed between and engageable with said springs and the other end pivotally connected to said lever.

2. An electric power transmitter comprising a frame, a rotatable driving member and a brake member carried by said frame, a rotatable and axially movable driven element carried by said frame, a friction disc disposed between said members and secured to said driven element, means for moving said disc into engagement with said members including a manually operated actuating lever having a pivotal axis, a leaf-type spring carried by said frame adapted to urge said lever to its brake engaged position, a second leaf-type spring carried by said frame and adapted to urge said lever in the opposite direction, and a link of adjustable length connecting said springs to said lever.

3. An electric power transmitter comprising a frame, a rotatable driving member and brake member carried by said frame, a rotatable and axially movable driven element carried by said frame, a friction disc disposed between said members and secured to said driven element, means for moving said disc into engagement with said members including a manually operated actuating lever having a pivotal axis, a leaf-type spring carried by said frame and adapted to urge said lever to its brake engaged position, a second leaf-type spring carried by said frame and adapted to urge said lever in the opposite direction, a link of adjustable length connecting said springs to said lever, and spring-force varying means adapted to change the force applied to said link by said springs.

4. An electric power transmitter comprising a frame, a rotatable driving member and a brake member carried by said frame, a rotatable and axially movable driven element carried by said frame, a friction disc disposed between said members and secured to said driven element, means for moving said disc into engagement with said members including a manually operated actuating lever having a pivotal axis, two spaced spring supports carried by said frame, a leaf-type spring disposed on one side of said supports and having a flexible free end, a second leaf-type spring disposed on the other side of said supports and having a flexible free end extending substantially parallel to said first spring, means urging said springs into engagement with said supports, and a link of adjustable length having one end disposed between and engageable with the free ends of said springs and the other end pivotally connected to said lever.

5. An electric power transmitter comprising a frame, a rotatable driving member and a brake member carried by said frame, a rotatable and axially movable driven element carried by said frame, a friction disc disposed between said members and secured to said driven element, means for moving said disc into engagement with said members including a manually operated actuating lever having a pivotal axis, two substantially parallel leaf-type springs carried by said frame, a link of adjustable length having one end disposed between and engageable with said springs, pivotal connecting means between said link and said block, and means adapted to position the pivotal axis of said pivotal connection parallel with the pivotal axis of said lever.

6. An electric clutch-brake driving device comprising a frame, a driving element carried by said frame, a brake element, a driven member disposed between said elements, actuating mechanism including a lever for moving said member into engagement with said elements, a plurality of springs carried by said frame, and a link of adjustable length connecting said lever to said springs.

7. An electric clutch-brake driving device comprising a frame, a driving element carried by said frame, a brake element carried by said frame, a driven member disposed between said elements, means for selectively connecting said member to said elements, actuating mechanism for said connecting means including a control lever, a link of adjustable length having one end connected to said lever, and leaf-type springs carried by said frame and engaging the other end of said link.

References Cited in the file of this patent

UNITED STATES PATENTS

| | | |
|---|---|---|
| 1,423,785 | Wilde | July 25, 1922 |
| 2,068,929 | Peets | Jan. 26, 1937 |
| 2,546,393 | Hale | Mar. 27, 1951 |
| 2,585,146 | Maiorany | Feb. 12, 1952 |